H. B. WHITEHEAD.
Universal Joint-Couplings.
No. 135,054.  Patented Jan. 21, 1873.
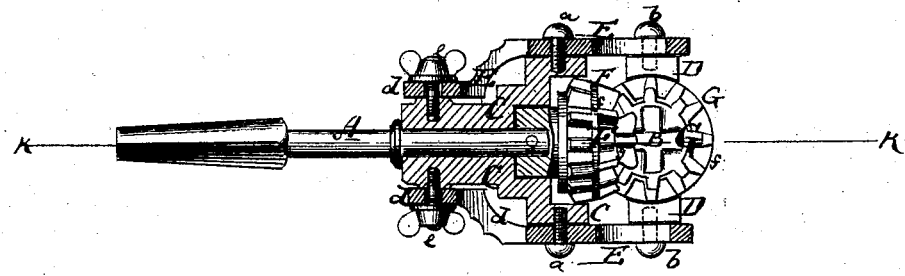
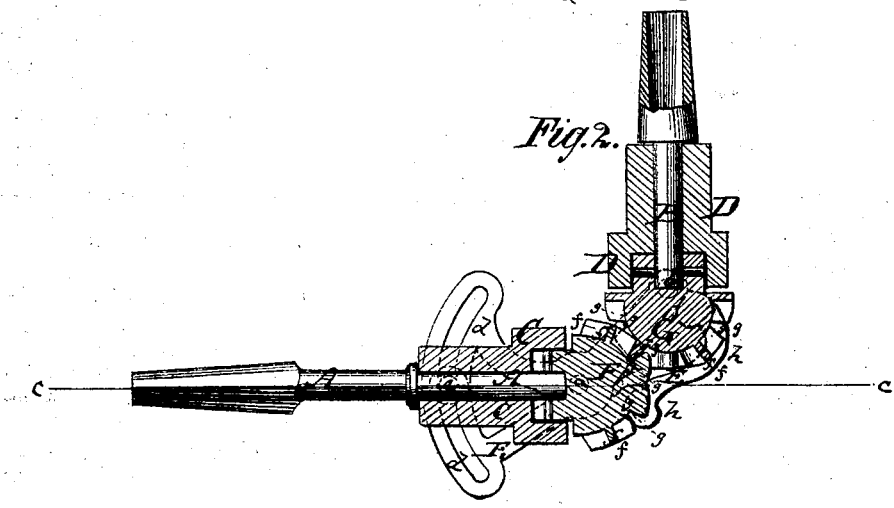
Witnesses:
John Becker.
Alex F. Roberts
Inventor:
H. B. Whitehead
per Munn & Co.
Attorneys.

UNITED STATES PATENT OFFICE.

HENRY B. WHITEHEAD, OF HOLLY SPRINGS, MISSISSIPPI.

IMPROVEMENT IN UNIVERSAL-JOINT COUPLINGS.

Specification forming part of Letters Patent No. 135,054, dated January 21, 1873.

*To all whom it may concern:*

Be it known that I, HENRY B. WHITEHEAD, of Holly Springs, in the county of Marshall and State of Mississippi, have invented a new and Improved Mechanical Movement, of which the following is a specification:

Figure 1 is a horizontal section of my improved mechanical movement, the line *c c*, Fig. 2, indicating the plane of section. Fig. 2 is a vertical section of the same on the line K K, Fig. 1.

Similar letters of reference indicate corresponding parts.

My invention consists in the use of hemispherical gears forming the contiguous ends of two shafts, which are hung in sleeves, and the combination therewith of slotted, pivoted side plates or links and adjusting-screws, all suitably arranged to permit the shafts to be set at any angle to each other, and yet permit their rotary movement at said angle in like manner as when the same are in alignment.

A and B in the drawing are the two shafts to be connected. They are hung in sleeves C and D, respectively, which are connected with each other by plates or links E E that are pivoted at *a* and *b* to the sides of the sleeves. At one end each plate E has a slotted segmental projection, *d*, through which a set-screw, *e*, enters the sleeve C, and whereby the two shafts can be clamped at a suitable angle to each other; for when the screws *e* are loosened the sleeves are at liberty to swing on their pivots *a b*, the plates E forming the frames on which they turn. F and G are two hemispherical cog-wheels fastened upon the ends of the two shafts A B, respectively, and in contact with each other at their rounded faces. By means of alternate projecting rings *f* and grooves *g*, formed concentrically on the cog-wheels, the same are divided into several zones, each of which has its own system of teeth, so that at the outer rim each wheel may have more teeth than toward the pole, and still all of equal depth.

It is evident that where one wheel has a ring, *f*, the other has a groove in corresponding position, so that when the two shafts are changed in angle, and the two wheels roll off on each other, the rings may enter the grooves and help steady the parts during motion. In place of regular cogs, projecting pins and corresponding sockets may be provided on the wheels.

The links E E have projecting scrolls or arms *h h*, which extend far enough to prevent the wheels in turning from wearing on the surfaces near which they may operate.

Having thus described my invention, I claim as new and desire to secure by Letters Patent—

The improved coupling formed of the hemispherical gears F and G, sleeves C D, side links or plates E E provided with slotted segmental projections *d* and set-screws *e*, all constructed and arranged and applied to the shafts A B, as shown and described.

HENRY B. WHITEHEAD.

Witnesses:
   JIM JAMES,
   JOHN T. WHITEHEAD.